US006257646B1

(12) United States Patent
Searfoss

(10) Patent No.: US 6,257,646 B1
(45) Date of Patent: Jul. 10, 2001

(54) SLIDING PIVOT FOR A TRUCK BED COVER BOW

(76) Inventor: Timothy K. Searfoss, 1282 E. M-55, West Branch, MI (US) 48661

( * ) Notice: Subject to any disclaimer, the term of this patent is extended or adjusted under 35 U.S.C. 154(b) by 0 days.

(21) Appl. No.: 09/181,323

(22) Filed: Oct. 28, 1998

(51) Int. Cl.[7] .................................................... B60P 7/04
(52) U.S. Cl. .............................................. 296/98; 160/74
(58) Field of Search ..................... 296/100.14, 100.15, 296/100.18, 100.11, 100.12, 100.13, 98; 160/74, 80

(56) References Cited

U.S. PATENT DOCUMENTS

| 3,868,142 | * | 2/1975 | Bachand et al. ............ 296/100.14 X |
| 4,874,196 | | 10/1989 | Goldstein et al. . |
| 5,031,955 | | 7/1991 | Searfoss . |
| 5,076,174 | | 12/1991 | Martin . |
| 5,094,499 | | 3/1992 | Simone, Jr . |
| 5,125,713 | | 6/1992 | Willingham et al. . |
| 5,211,440 | | 5/1993 | Cramaro . |
| 5,218,743 | | 6/1993 | Miller . |
| 5,238,287 | | 8/1993 | Haddad, Jr. . |
| 5,240,304 | | 8/1993 | Cramaro et al. . |
| 5,292,169 | | 3/1994 | O'Brian . |
| 5,328,228 | | 7/1994 | Klassen . |
| 5,330,246 | | 7/1994 | Bernardo . |
| 5,340,187 | | 8/1994 | Haddad, Jr. . |
| 5,524,953 | | 6/1996 | Shaer . |
| 5,697,663 | | 12/1997 | Chenowth . |
| 5,697,664 | | 12/1997 | Chenowth . |
| 5,713,712 | | 2/1998 | McIntyre . |
| 5,752,735 | | 5/1998 | Fleming et al. . |

\* cited by examiner

Primary Examiner—D. Glenn Dayoan
Assistant Examiner—Jason Morrow
(74) Attorney, Agent, or Firm—Brooks & Kushman P.C.

(57) ABSTRACT

An apparatus is disclosed for moving a cover over a bed of a truck. The apparatus comprises a pair of rails, a pair of bows and a pair of cylinders. Each bow has a first end connected to a cover and a second end connected to a follower adjustable along an associated rail. The cylinders are connected to an associated follower, and develop a force along a plane defined by the rails to slide the followers along the rails. The bows are slidable and pivotable to move the cover over the bed of the truck from a retracted position proximate a front end of the bed to an extended position proximate a rear end of the bed. A raisable tower is preferably also provided.

33 Claims, 3 Drawing Sheets

SLIDING PIVOT FOR A TRUCK BED COVER BOW

TECHNICAL FIELD

This invention relates to covers for truck beds, and more particularly to a sliding pivot for a truck bed cover bow.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. My U.S. Pat. No. 5,031,955 provides a truck cover which may be conveniently motor operated from the cab of a truck while simultaneously extending the cover over the truck bed and pressing down on the front of the cover proximate a winding assembly which winds up the cover at the front of the truck bed. Similarly, U.S. Pat. No. 5,238,287 shows a front mount telescopic arm truck cover system, and U.S. Pat. No. 5,524,953 shows a contractible vehicle bed cover assembly with an extendable closure.

Container trucks, however, present special problems. In particular, such container trucks tend to have differently sized beds, and are required to accept containers of different dimensions. To accommodate these variances, the arms normally used in conventional truck bed covers have to be long enough to reach from their mounting point to both the front and rear ends of the truck bed. U.S. Pat. No. 5,292,169 shows such a truck container cover. Not only do such arms require great effort to move from either their forward most or rearward most position, but they are not able to efficiently accommodate containers of different sizes.

U.S. Pat. No. 5,752,735 shows one attempt to address at least this latter problem with adjustable pivot points shifted along opposite rails by hydraulic cylinders. This design, however, uses rephasing cylinders which furthermore are not arranged in line with the rails.

DISCLOSURE OF INVENTION

The present invention is an apparatus for moving a cover over a bed of a truck. The apparatus comprises a rail, a bow and a cylinder. The bow has a first end connected to the cover and a second end adjustable along the rail. The cylinder is connected to the second end of the bow and develops a force along an axis defined by the rail to adjust the second end of the bow.

Accordingly, an object of this invention is to provide an apparatus of the type described above which pivotally connects a truck cover bow to the truck.

Another object of this invention is to provide an apparatus of the type described above which requires a smaller clearance than conventional truck bed covers.

Still another object of this invention is to provide an apparatus of the type described above which is suitable for use with container trucks.

Still another object of this invention is to provide an apparatus of the type described above which has adjustable pivots.

Still another object of this invention is to provide an apparatus of the type described above which has two same sized cylinders Still another object of this invention is to provide an apparatus of the type described above in which force applied in line with movement of pivots.

These and other objects, features, and advantages of the present invention are readily apparent from the following detailed description of the best mode for carrying out the invention when taken in conjunction with the accompanying drawings.

BRIEF DESCRIPTION OF DRAWINGS

FIG. 4 is a perspective view of a sliding pivot of the apparatus; and

FIG. 5 is a schematic view of a hydraulic circuit of the apparatus.

BEST MODE FOR CARRYING OUT THE INVENTION

Figure 1:
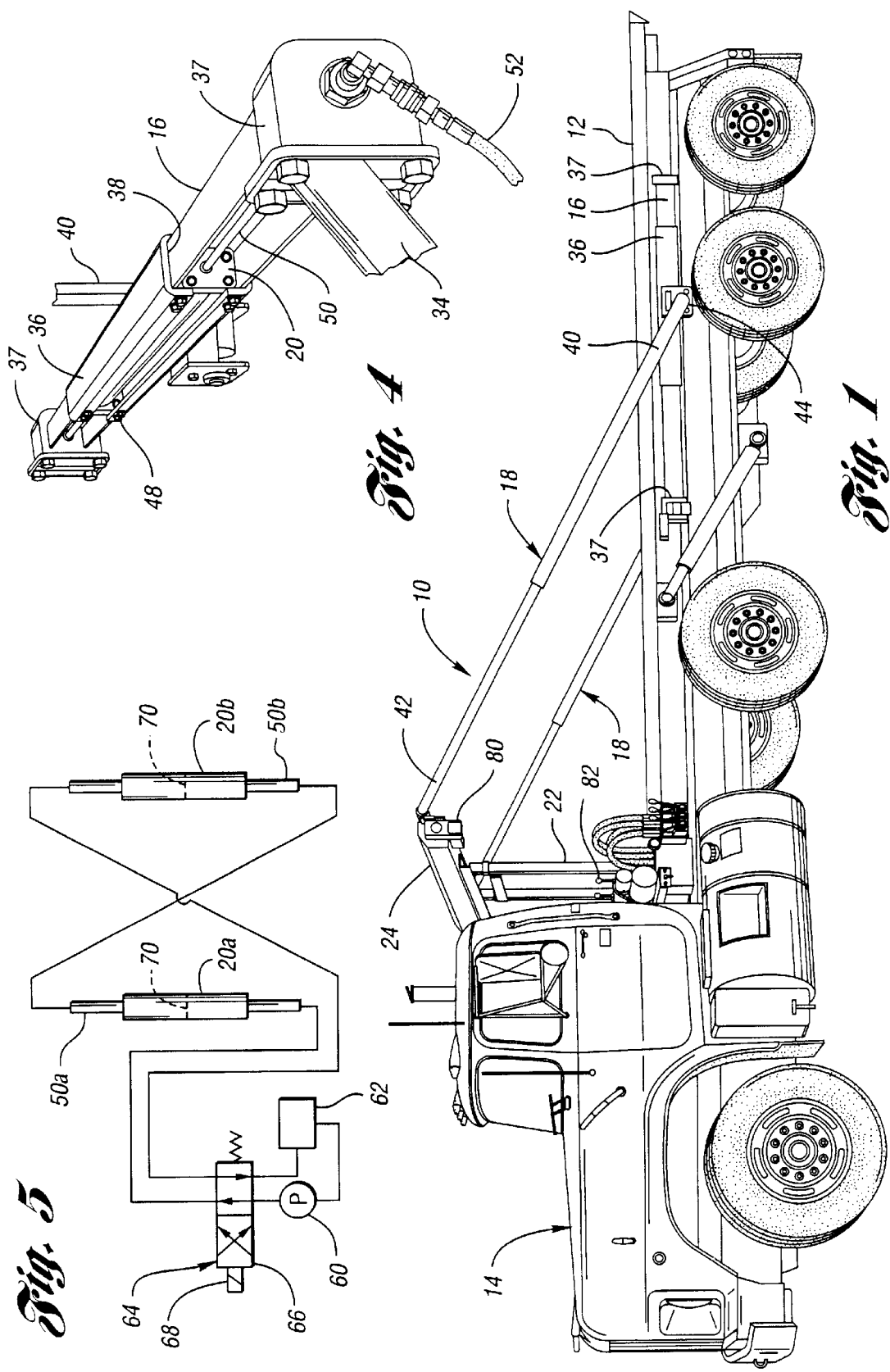
FIG. 1 is a perspective view of a truck including an apparatus according to the present invention for moving a cover over a bed of the truck.

With reference to the drawings, the preferred embodiments of the present invention will be described. FIGS. 1–4 show an apparatus 10 according to the present invention for covering a bed 12 of a truck 14. While the truck is shown unloaded, it should be appreciated that the present invention contemplates that a container or other load is carried on the bed 12. The apparatus 10 comprises a pair of inner rails 16, a pair of bows 18, and a pair of cylinders 20.

Figure 2:
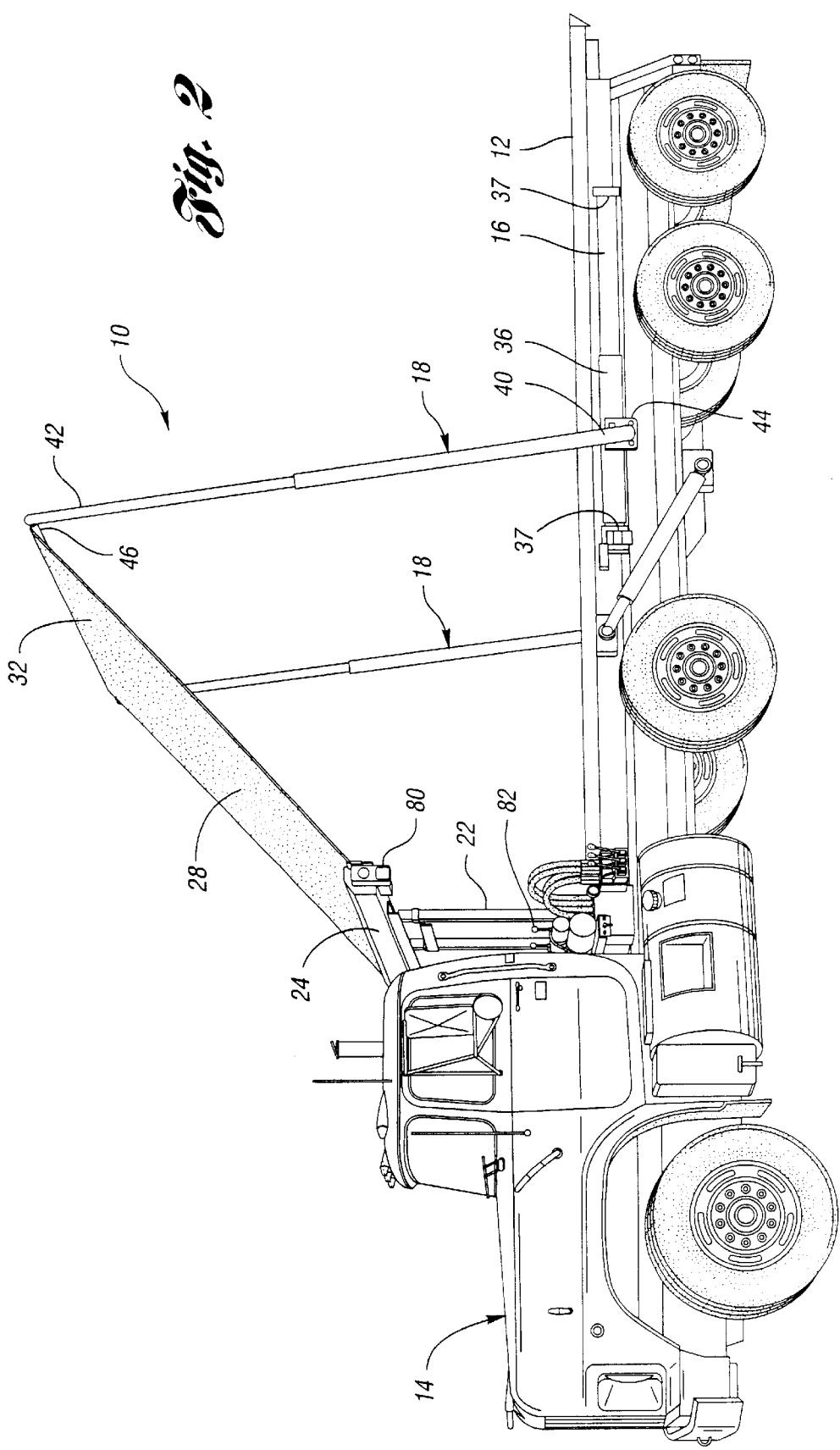
FIG. 2 is a perspective view of the truck with the apparatus in an intermediate position.
Figure 3:
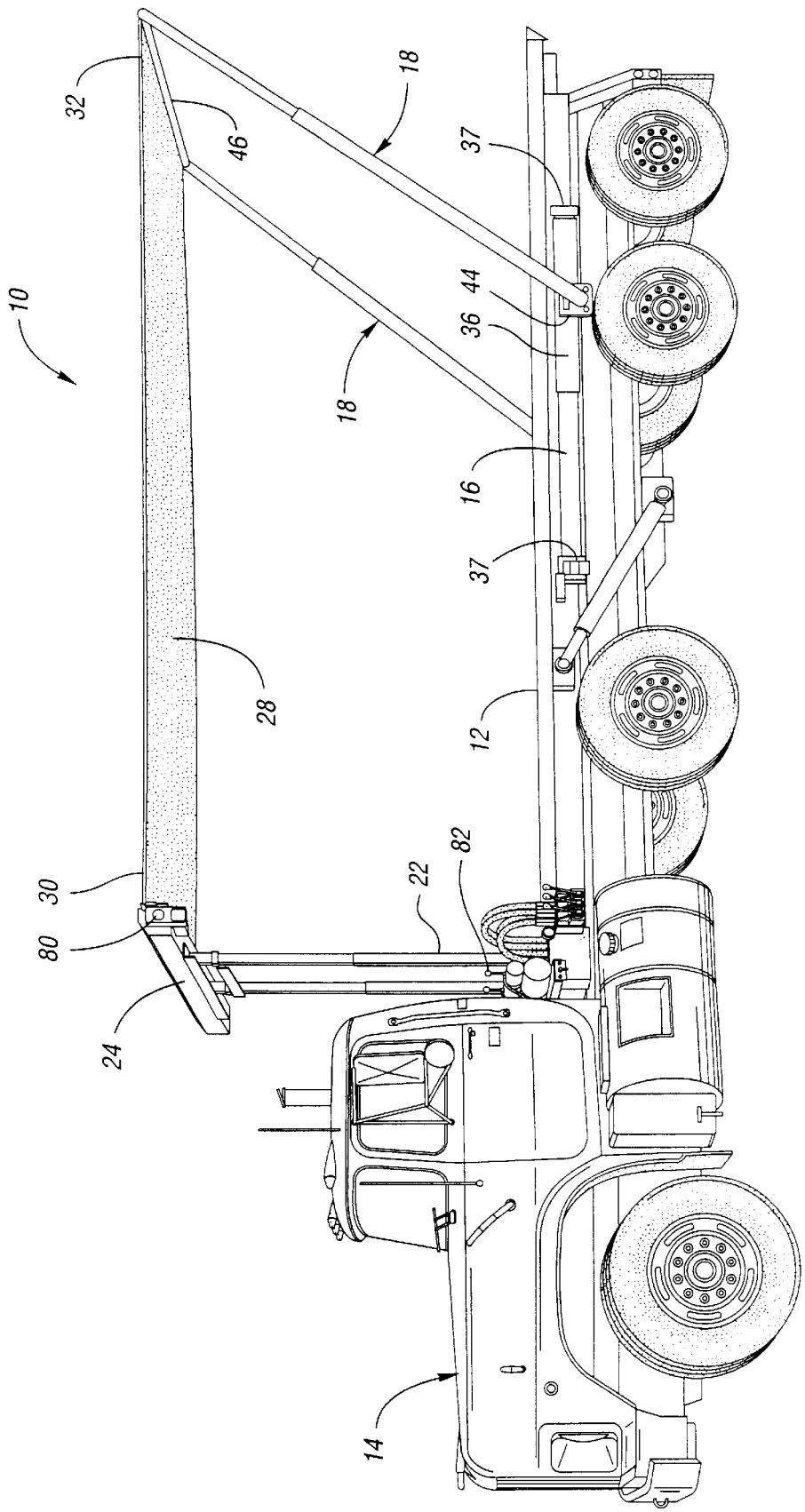
FIG. 3 is a perspective view of the truck with the apparatus in a further intermediate position.

A tower 22 is disposed proximate the front of the truck bed 12, and is hydraulically movable as is well known between a lowered position shown in FIGS. 1–2 and a raised position shown in FIG. 3. The tower 22 carries a head assembly 24 which includes a spool rotatably mounted within the head assembly. A preferably flexible, cloth or tarpaulin cover 28 is windable on the spool, with a first end 30 connected to the spool and a distal second end 32 as best shown in FIG. 3.

The inner rails 16 are preferably elongated aluminum extrusions mounted in a generally horizontal orientation proximate the left and right sides, respectively, of the truck bed 12. The inner rails 16 may be connected by extension 34 or otherwise to the truck frame or fenders, and are advantageously situated slightly below the level of the truck bed 12. An outer rail or follower 36 cooperates with each of the inner rails 16 and is slidable or otherwise adjustable there along between front and rear stops 37. To facilitate this movement, the rail assemblies may each be provided with a friction-reducing bushing 38 shown in FIG. 4. The bushings 38 are disposed between the inner and outer rails 16 and 36, respectively, and are connected to the outer rails to be movable therewith. The bushings 38 preferably comprise a polymeric material such as acrylonitrile-butadiene-styrene (ABS).

The bows 18 are preferably formed of fabricated or extruded aluminum or steel alloy, and are disposed proximate the opposite sides of the truck bed 12. The bows 18 each have a lower end 40 and an upper end 42. The lower end 40 of each bow 18 pivotably cooperates with an associated outer rail 36, preferably through a hinge 44 as described in my U.S. patent application Ser. No. 08/812,763 filed Mar. 6, 1997 and entitled Pivot Mounting for a Truck Bed Cover, the disclosure of which is hereby incorporated by reference. The upper end 42 of each bow is connected to the distal end 32 of the cover 28, preferably by way of a transverse bow member 46.

FIG. 4 shows that the cylinders 20 are disposed generally inside the generally rectangular in cross-section inner rails 16. Each cylinder 20 is connected to an associated outer rail 36, by bolts 48 or otherwise, and is movable along a rod 50 which is preferably fixed with respect to the truck. Automatic transmission fluid, oil or other fluid fed through hydraulic lines 52 and the rod 50 and into the cylinders 20 moves the cylinders either forwardly or rearwardly along the rods. Because the inner rails 16 each define an axis, and the inner rails lie generally in the same plane, the cylinders 20 develop a force along the plane defined by the inner rails to slide the followers 36 and the second ends 40 of the bows 18 along the inner rails.

FIG. 5 schematically shows the layout of the hydraulic circuit. A pump 60, preferably electrically powered so that the truck hydraulics are not disturbed, draws fluid from a reservoir 62. With a valve 64 in the position shown, the pump 60 forces fluid through the lower end of the left side rod 50a. This action causes the left side cylinder 20a to shift upwardly as shown in FIG. 5, and displaces a like amount of fluid out through the upper end of the left side rod 50a and into the lower end of the right side rod 50b. This action in turn forces the right side cylinder 20b to likewise shift upwardly, displacing a like amount of fluid out the upper end of right side rod 50b, back through the valve 64 and into the reservoir 62. The resulting synchronized movement of the cylinders also simultaneously shifts the outer rails 36, and the lower ends 40 of the bows 18 fixed thereto. To reverse this movement, the valve 64 is simply shifted to a second position 66 by a solenoid 68, stepper motor or other automatic or manual means of adjusting the valve. A particular advantage of this closed loop design is that the cylinders 20 have the same cross-section, and the pistons 70 fixed to the rods 50 within the cylinders have the same effective cross-sectional area. The pump 60 may also drive the tower hydraulics through a different valve and circuit.

A motor 80 is provided to drive the spool to wind the cover 28 against the rearward bias normally developed on the bows by the pivot mounting 44. The motor is preferably a direct drive electric gear motor as described in my U.S. patent application Ser. No. 08/956,574 filed Oct. 23, 1997 and entitled Electric Tarp System For Truck Bed, the disclosure of which is hereby incorporated by reference. Through a series of hand-operated controls 82, each bow 18 is thus slidable and pivotable to move the cover 28 over the bed 12 of the truck from a retracted position shown in FIG. 1 proximate the front end of the bed to an extended position shown in FIG. 3 proximate the rear end of the bed. In particular, the tower 22 assumes its fully raised position to minimize interference of the load or container with the travel of the cover. After reaching the extended position, the tower 22 can be lowered, and the outer rails 36 slid forward slightly, to draw the cover tightly over the load or container on the truck bed 12.

Preferably, the tower to outer rail travel ratio is in the range of about 3:4. It should also be appreciated that a tension bow may be provided for applying a downward force to the cover proximate the front end of the load bed to facilitate holding the cover proximate the load or container. Further details of this arrangement may be found in my U.S. Pat. No. 5,031,955, the disclosure of which is hereby incorporated by reference.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. An apparatus for moving a cover over a bed of a truck, the apparatus comprising:
    a rail defining an axis;
    a bow having a first end connected to the cover and a second end adjustable along the rail; and
    a cylinder connected to the second end of the bow and developing a force along the axis to adjust the second end of the bow.

2. The apparatus of claim 1 wherein the cylinder is disposed inside the rail.

3. The apparatus of claim 1 wherein the cylinder is hydraulically actuated.

4. The apparatus of claim 1 wherein the cylinder cooperates with a rod.

5. The apparatus of claim 4 wherein the rod has a first end in communication with a source of fluid to move the cylinder relative to the rod.

6. The apparatus of claim 4 wherein the rod has first and second ends in communication with a source of fluid to move the cylinder relative to the rod.

7. The apparatus of claim 1 further comprising a tower connected to the cover.

8. The apparatus of claim 7 wherein the tower is movable between a lowered position and a raised position.

9. The apparatus of claim 7 wherein a spool for the cover is connected to the tower.

10. The apparatus of claim 1 wherein the second end of the bow comprises a follower cooperating with the rail.

11. The apparatus of claim 10 further comprising a bushing disposed between the rail and the follower.

12. The apparatus of claim 11 wherein the bushing comprises a polymeric material.

13. The apparatus of claim 11 wherein the bushing comprises ABS.

14. The apparatus of claim 1 wherein the cover is flexible.

15. The apparatus of claim 1 wherein the rail comprises an elongated, generally horizontally disposed member connected to the truck.

16. The apparatus of claim 1 wherein the rail has a generally rectangular cross-section.

17. An apparatus for moving a cover over a bed of a truck, the apparatus comprising:
    a pair of rails;
    a pair of bows, each bow having a first end connected to the cover and a second end adjustable along an associated rail; and
    a pair of cylinders, each cylinder being connected to the second end of an associated bow, the cylinders having the same cross-section.

18. The apparatus of claim 17 wherein the rails define a plane, and the cylinders develop a force along the plane to adjust the second end of the bow.

19. The apparatus of claim 17 wherein each cylinder is disposed inside an associated rail.

20. The apparatus of claim 17 wherein the cylinders are hydraulically actuated.

21. The apparatus of claim 17 wherein each cylinder cooperates with an associated rod.

22. The apparatus of claim 21 wherein each rod has first and second ends in communication with a source of fluid to move the associated cylinder relative to the rod.

23. The apparatus of claim 17 further comprising a tower connected to the cover.

24. The apparatus of claim 23 wherein the tower is movable between a lowered position and a raised position.

25. The apparatus of claim 23 wherein a spool for the cover is connected to the tower.

26. The apparatus of claim 17 wherein the second end of each bow comprises a follower cooperating with the associated rail.

27. The apparatus of claim 26 further comprising a bushing disposed between the rail and the follower.

28. The apparatus of claim 27 wherein the bushing comprises a polymeric material.

29. The apparatus of claim 27 wherein the bushing comprises ABS.

30. The apparatus of claim 17 wherein the cover is flexible.

31. The apparatus of claim 17 wherein each rail comprises an elongated, generally horizontally disposed member connected to the truck.

32. The apparatus of claim 17 wherein each rail has a generally rectangular cross-section.

33. An apparatus for covering a bed of a truck, the apparatus comprising:

- a tower movable between a lowered position and a raised position;
- a spool mounted on the tower;
- a flexible cover having a first end connected to the tower and a second end;
- a pair of elongated, generally rectangular rails connected to the truck;
- a pair of bows, each bow having a first end connected to the second end of the cover and a second end connected to a follower; and
- a pair of cylinders having the same cross-section, each cylinder being connected to an associated follower and developing a force along a plane defined by the rails to slide the followers along the rails;
- each bow being pivotable and slidable to move the cover over the bed of the truck from a retracted position proximate a front end of the bed to an extended position proximate a rear end of the bed.

* * * * *